US012335586B2

(12) United States Patent
Liao et al.

(10) Patent No.: US 12,335,586 B2
(45) Date of Patent: Jun. 17, 2025

(54) CAMERA DEVICE AND LONG TUNING RANGE CAMERA ASSEMBLY

(71) Applicant: Lanto Electronic Limited, Kunshan (CN)

(72) Inventors: Yu-Huai Liao, Taipei (TW); Fu-Yuan Wu, Taipei (TW); Shang-Yu Hsu, Taipei (TW)

(73) Assignee: Lanto Electronic Limited, Kunshan (CN)

( * ) Notice: Subject to any disclaimer, the term of this patent is extended or adjusted under 35 U.S.C. 154(b) by 263 days.

(21) Appl. No.: 18/074,908

(22) Filed: Dec. 5, 2022

(65) Prior Publication Data

US 2023/0179845 A1 Jun. 8, 2023

(30) Foreign Application Priority Data

Dec. 6, 2021 (CN) .......................... 202111511468.3

(51) Int. Cl.
*H04N 23/51* (2023.01)
*G01D 5/14* (2006.01)
*H04N 23/90* (2023.01)

(52) U.S. Cl.
CPC ............ *H04N 23/51* (2023.01); *H04N 23/90* (2023.01); *G01D 5/14* (2013.01)

(58) Field of Classification Search
CPC ........ H04N 23/51; H04N 23/90; H04N 23/55; H04N 23/57; H04N 23/50; G01D 5/14; G01D 5/145
See application file for complete search history.

(56) References Cited

U.S. PATENT DOCUMENTS

| 2015/0049209 A1 | 2/2015 | Hwang et al. |
| 2019/0346655 A1* | 11/2019 | Lin .......................... G02B 7/09 |
| 2020/0244147 A1 | 7/2020 | Ko et al. |

FOREIGN PATENT DOCUMENTS

| CN | 109960003 A | 7/2019 |
| CN | 209055734 U | 7/2019 |
| CN | 209446872 U | 9/2019 |
| CN | 112492126 A | 3/2021 |
| CN | 112711112 A | 4/2021 |
| TW | I650587 B | 2/2019 |

* cited by examiner

*Primary Examiner* — James M Hannett
*Assistant Examiner* — Angel L Garces-Rivera
(74) *Attorney, Agent, or Firm* — Birch, Stewart, Kolasch & Birch, LLP

(57) ABSTRACT

The present disclosure provides a camera device and a long tuning range camera assembly. The camera device comprises a frame body, a circuit component, a carrying component, and a magnetic conductive sheet. The frame body comprises an accommodating space. The circuit component comprises a circuit board, a magnetic sensing element, and a coil. The carrying component comprises a main body, a driving magnet, and a sensing magnet. Wherein the magnetic sensing element is configured to magnetically sense the sensing magnet to generate a specific signal, which comprises an angle between the sensing magnet and the magnetic sensing element or/and a position of the main body relative to the frame body. The long tuning range camera assembly comprises two sets of camera devices.

16 Claims, 9 Drawing Sheets

CAMERA DEVICE AND LONG TUNING RANGE CAMERA ASSEMBLY

CROSS-REFERENCE TO RELATED APPLICATION

This application claims the priority benefit of Chinese Patent Application Serial Number 202111511468.3, filed on Dec. 6, 2021, the full disclosure of which is incorporated herein by reference.

BACKGROUND

Technical Field

The present disclosure relates to the technical field of camera assembly, particularly to a camera device and a long tuning range camera assembly.

Related Art

Conventional voice coil motors comprise a sensing magnet and a Hall device to obtain distance information of lens movement. With the increase of various cameras module, various requirements for lens movement have been rising. Under the requirements for the long tuning range voice coil motor (VCM), it is necessary to arrange multiple Hall devices to sense position information and to obtain the position information from the long tuning range lenses Through the calculation of complex superposition signal. The above configuration needs to arrange multiple of Hall devices to correspond to sensing magnets, which would not only increase material costs but would also enlarge the overall size of the device and of which the assembly difficulty is increased.

SUMMARY

The embodiments of the present disclosure provide a camera device and a long tuning range camera assembly tended to solve the problem of the poor sensing performance to the lens position, the over cost, oversize of camera devices and long tuning range camera assembly through a combining design of magnetic sensors, sensing magnets, and the magnetic conductive sheets.

The present disclosure provides a camera device, comprising a frame body, a circuit component, a carrying component, and a magnetic conductive sheet. The frame body forms an accommodating space. The circuit component comprises a circuit board, a magnetic sensing element, and a coil. The magnetic sensing element and the coil are disposed on the circuit board. The circuit board is disposed on the frame body. The magnetic sensing element and the coil are disposed at one side of the frame body. The carrying component comprises a main body, a driving magnet, and a sensing magnet. The main body is disposed in the accommodating space and movable in the space. The sensing magnet and the driving magnet are disposed at one side of the main body. The sensing magnet corresponds to the magnetic sensing element. The driving magnet corresponds to the coil. The magnetic conductive sheet is disposed at the frame body. The magnetic conductive sheet is disposed at one side of the driving magnet or/and the sensing magnet. In addition, the magnetic sensing element is configured to sense the magnetic and then output the specific signal which contains the angle and position of main body relative to the frame body.

In one embodiment, the magnetic conductive sheet comprises a body having an elongated rectangular sheet-structural configuration.

In one embodiment, the magnetic conductive sheet comprises a body and a notch disposed at one side of the body close to the sensing magnet.

In one embodiment, the magnetic conductive sheet comprises a body and a tab disposed at one side of the body close to the sensing magnet.

In one embodiment, the frame body comprises a bottom plate and a side plate perpendicular to the bottom plate. The accommodating space is formed between the bottom plate and the side plate. The sensing magnet is disposed on bottom surface of the main body of carrying component. The driving magnet is disposed on the side surface of the main body of carrying component. The magnetic conductive sheet is disposed on the bottom plate.

In one embodiment, the magnetic conductive sheet overlaps with the driving magnet in a direction perpendicular to the bottom plate.

In one embodiment, the magnetic conductive sheet completely overlaps with the driving magnet and partially overlaps with the sensing magnet in the direction perpendicular to the bottom plate.

In one embodiment, the magnetic conductive sheet comprises a body and two tabs disposed at one side of the body close to the sensing magnet. A notch exists between the two tabs. In the direction perpendicular to the bottom plate, the body completely overlaps with the driving magnet, the two tabs do not overlap with the sensing magnet, and the sensing magnet is partially disposed in the notch.

In one embodiment, the magnetic conductive sheet comprises a body and a tab. In the direction perpendicular to the bottom plate, the body completely overlaps with the driving magnet, the tab is disposed in the middle of the body and at one side of the body close to the sensing magnet, and the tab partially overlaps with the sensing magnet.

In one embodiment, the driving magnet comprises a first driving magnet and a second driving magnet. A surface of the first driving magnet comprising a first driving magnetic pole corresponds to one end of the sensing magnet comprising a first sensing magnetic pole. A surface of the second driving magnet comprising a second driving magnetic pole corresponds to one end of the sensing magnet comprising a second sensing magnetic pole.

In one embodiment, the first driving magnetic pole and the first sensing magnetic pole have the same polarity. The second driving magnetic pole and the second sensing magnetic pole have the same polarity.

In one embodiment, the camera device further comprises a guiding component disposed between the frame body and the main body.

In one embodiment, the guiding component comprises a first guiding groove, a second guiding groove, and a guiding rod. The first guiding groove is disposed at the frame body. The second guiding groove is disposed at the main body in a manner corresponding to the first guiding groove. The guiding rod is disposed between the first guiding groove and the second guiding groove.

In one embodiment, in a moving direction of the main body, the length of the guiding rod matches the length of the second guiding groove, the length of the first guiding groove is greater than the length of the second guiding groove, and two ends of the guiding rod are configured to abut against a groove wall of two ends of the second guiding groove and to slide in the first guiding groove.

The present disclosure provides a long tuning range camera assembly, comprising a first camera device and a second camera device. The first camera device comprises the camera device according to the above aspects and a first lens component disposed at the main body of the first camera device. The second camera device comprises the camera device according to the above aspects and a second lens component disposed at the main body of the second camera device. The first lens component corresponds to the second lens component. The first lens component is aligned with the second lens component.

In the embodiments of the present disclosure, by disposing the driving magnet and the sensing magnet on the main body carrying the lens component, the main body can be movably disposed on the frame body, and the frame body comprises a magnetic sensing element and a magnetic conductive sheet. The magnetic sensing element corresponds to the sensing magnet, and the magnetic conductive sheet corresponds to one side of the driving magnet or/and the sensing magnet. The long tuning range camera assembly is formed by the combination of a plurality of camera devices. The magnetic flux concentrating of the sensing magnet is enhanced by the magnetic conductive sheet so that the magnetic sensing element could sense the movement of the sensing magnet with higher accuracy, and the space occupied in the housing could be reduced with the total cost lowered.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
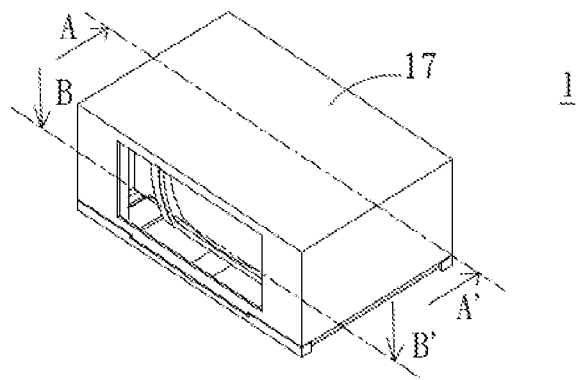
FIG. 1 is a perspective view of a camera device of the present disclosure.
Figure 2:
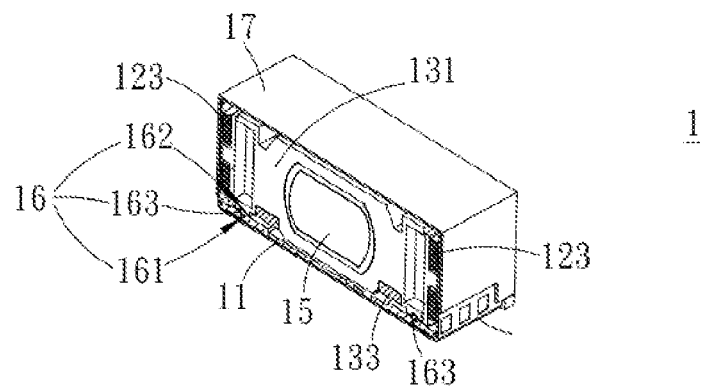
FIG. 2 is a cross-sectional view along line A-A' of FIG. 1.
Figure 3:
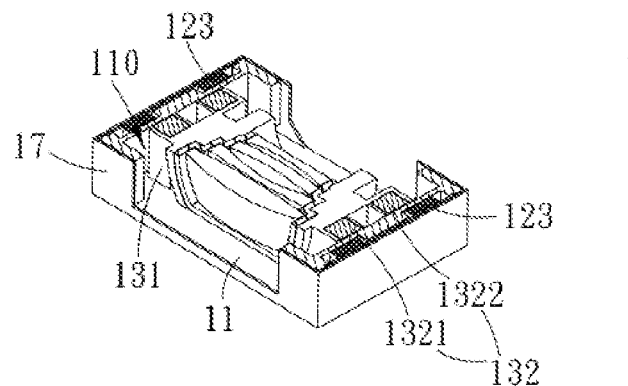
FIG. 3 is a cross-sectional view along line B-B' of FIG. 1.
Figure 4:
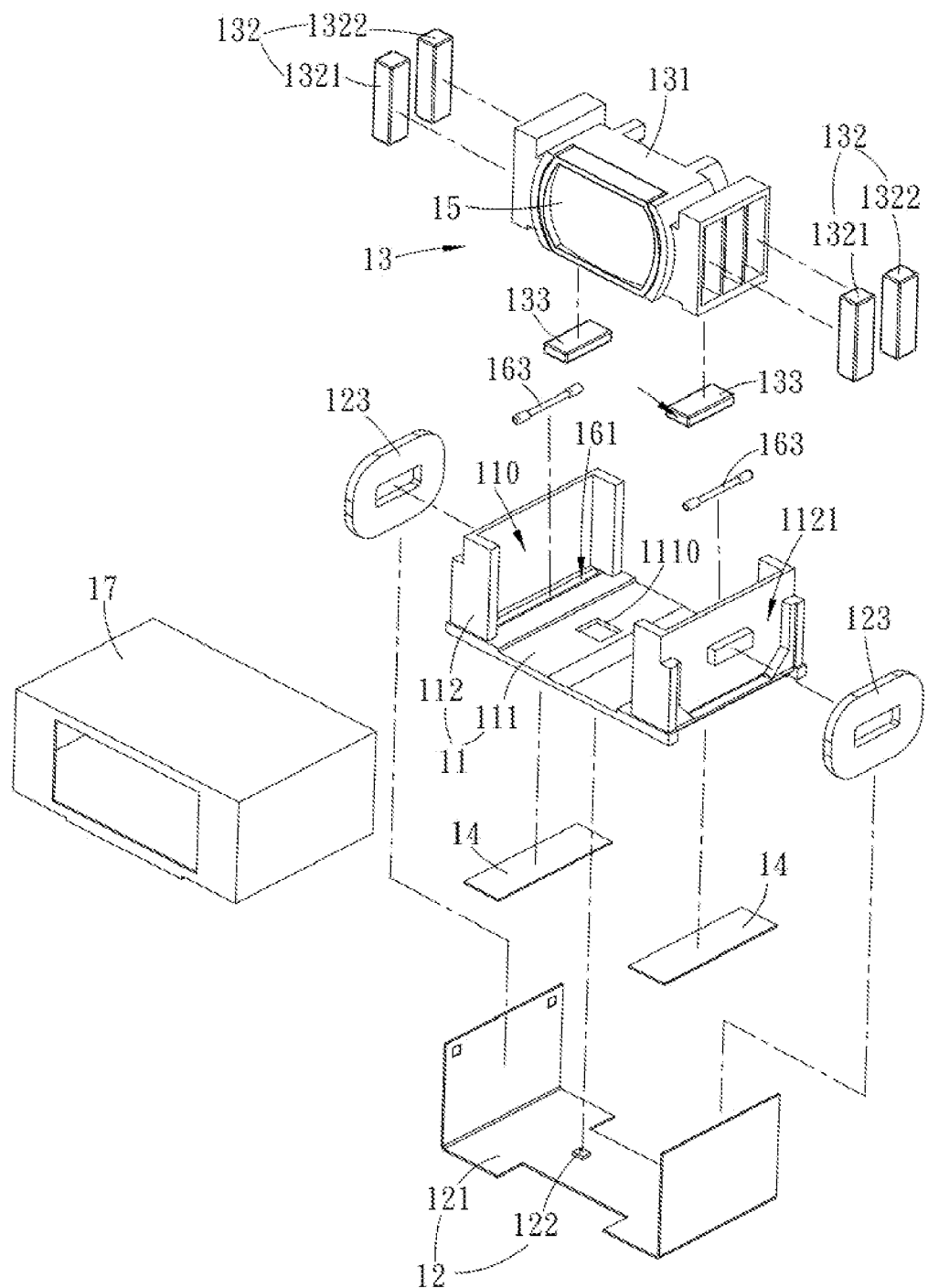
FIG. 4 is an exploded view of the camera device of the present disclosure.
Figure 5:
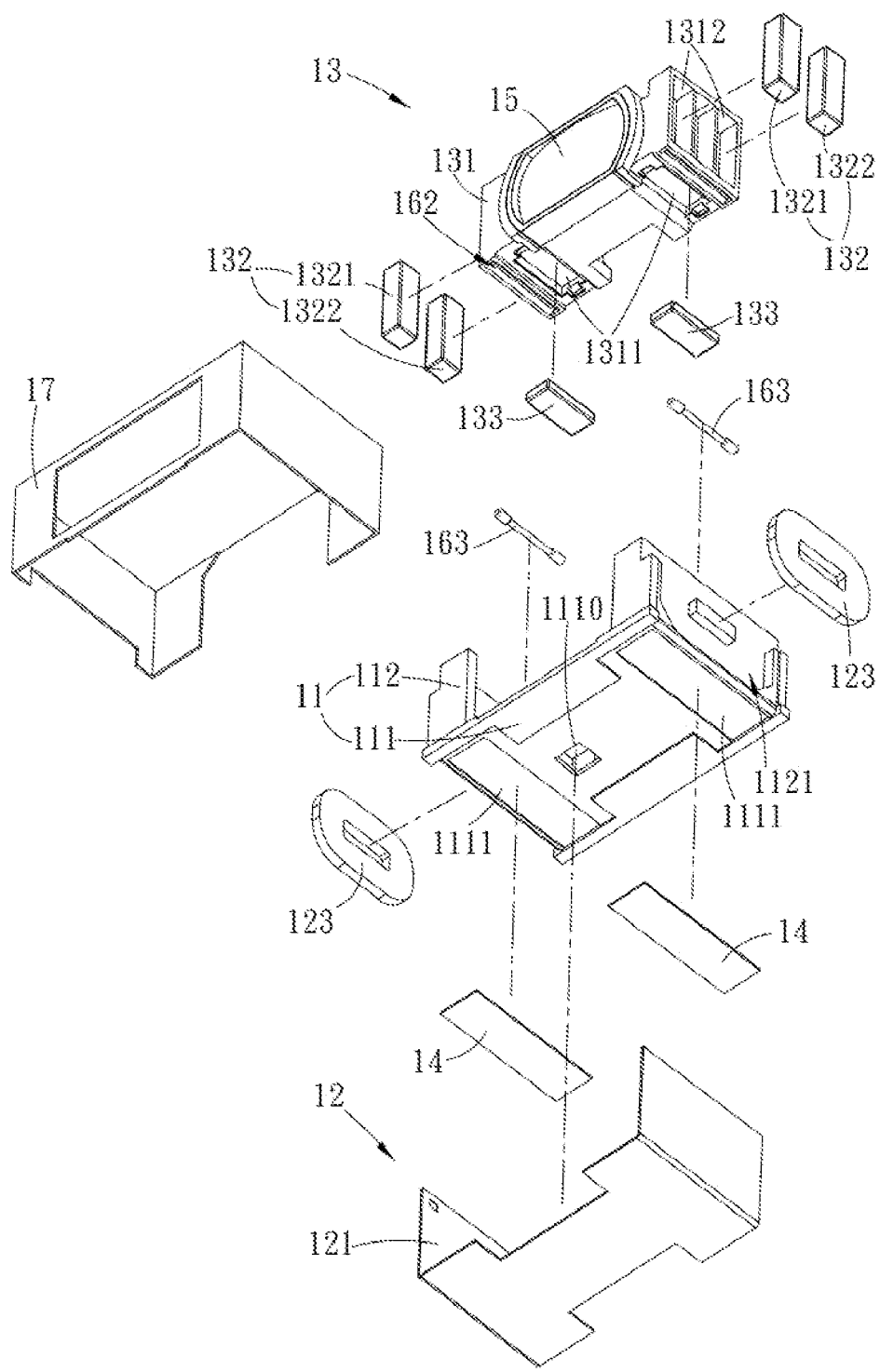
FIG. 5 is another exploded view of the camera device of the present disclosure.

FIG. 1 is a perspective view of a camera device of the present disclosure. FIG. 2 is a cross-sectional view along line A-A' of FIG. 1. FIG. 3 is a cross-sectional view along line B-B' of FIG. 1. FIG. 4 is an exploded view of the camera device of the present disclosure. FIG. 5 is another exploded view of the camera device of the present disclosure. As shown in the figures, the present disclosure provides a camera device 1, which comprises a frame body 11, a circuit component 12, a carrying component 13, and a magnetic conductive sheet 14. The frame body 11 comprises an accommodating space 110. The circuit component 12 comprises a circuit board 121, a magnetic sensing element 122, and a coil 123. The magnetic sensing element 122 and the coil 123 are disposed on the circuit board 121. The circuit board 121 is disposed at the frame body 11. The circuit board 121 is flexible. The magnetic sensing element 122 and the coil 123 are disposed at one side of the frame body 11. The carrying component 13 comprises a main body 131, a driving magnet 132, and a sensing magnet 133. The main body 131 is movably disposed in the accommodating space 110. The sensing magnet 133 and the driving magnet 132 are disposed at one side of the main body 131. The sensing magnet 133 corresponds to the magnetic sensing element 122. The driving magnet 132 corresponds to the coil 123. The magnetic conductive sheet 14 is disposed at the frame body 11 and is disposed at one side of the driving magnet 132 or/and the sensing magnet 133. Wherein the magnetic sensing element 122 is configured to magnetically sense the sensing magnet 133 to generate a specific signal, which comprises information of an angle between the sensing magnet 133 and the magnetic sensing element 122 or/and position of the main body 131 relative to the frame body 11.

In this embodiment, The specific signal comprises the sensing signal of the magnetic sensing element 122, which indicates that the magnetic sensing element 122 is fixed at the position of the frame body 11, and the sensing magnet 133 is fixed at the position of the main body 131. Wherein the main body 131 could move relative to the frame body 11, and when the magnetic sensing element 122 senses each of the various positions of the sensing magnet 133, a data corresponding to the above-mentioned angle or position would be generated, namely the specific signal. Since the specific signal is not limited to the data described above, users could also calculate other required data through the sensing signal of the magnetic sensing element 122.

Referring to FIG. 4 and FIG. 5 again, in this embodiment, the frame body 11 comprises a bottom plate 111 and two side plates 112 vertically disposed at two side edges of the bottom plate 111. An accommodating space 110 is formed between the bottom plate 111 and the two side plates 112. The circuit board 121 of the circuit component 12 is disposed on an outer surface of the frame body 11. The bottom plate 111 comprises a through hole 1110, the magnetic sensing element 122 is disposed on the circuit board 121, and the magnetic sensing element 122 is disposed in the through hole 1110 of the bottom plate 111. The coil 123 is disposed on the circuit board 121, an outer surface of each of the two side plates 112 of the frame body 11 comprises a coil recess 1121 in which the coil 123 is embedded. In this way, the coil 123 could be disposed between the circuit board 121 and each of the two side plates 112 of the frame body 11.

The main body 131 is assembled and disposed in the accommodating space 110 of the frame body 11. The camera device 1 further comprises a lens component 15 assembled to the main body 131. The main body 131 can move back and forth in the accommodating space 110. Besides, the camera device 1 further comprises a housing 17 assembled to the frame body 11 so that the main body 131 is limited to be in the accommodating space 110. The sensing magnet 133 is disposed on a side surface of the main body 131 close to the bottom plate 111. One side of the main body 131 opposite to the magnetic sensing element 122 comprises a first recess 1311 in which the sensing magnet 133 is embedded. The magnetic sensing element 122 could perform electromagnetic sensing on the sensing magnet. The driving magnet 132 is disposed on a side surface of the main body 131 close to the side plate 112. Two sides of the main body 131 relative to the coil 123 comprise a plurality of second recesses 1312. The driving magnet 132 is embedded in the second recess 1312, and the magnetic field could be changed after the coil 123 is energized to generate a magnetic force on the driving magnet 132. In this way, the driving magnet 132 could drive the main body 131 to move within the accommodating space 110. The magnetic conductive sheet 14 is disposed on the bottom plate 111. Wherein a bottom surface of the bottom plate 111 of the frame body 11 comprises a bottom recess 1111 in which the magnetic conductive sheet 14 is embedded. In the present disclosure, by disposing the magnetic conductive sheet 14 on one side of the driving magnet 132 or/and the sensing magnet 133, the magnetic conductive sheet 14 could be used to enhance the concentrating of the magnetic flux of the driving magnet 132 or/and the sensing magnet 133, enabling the magnetic sensing element 122 to sense the change of the position or distance of the sensing magnet 133 relative to the magnetic sensing element 122.

Figure 8:
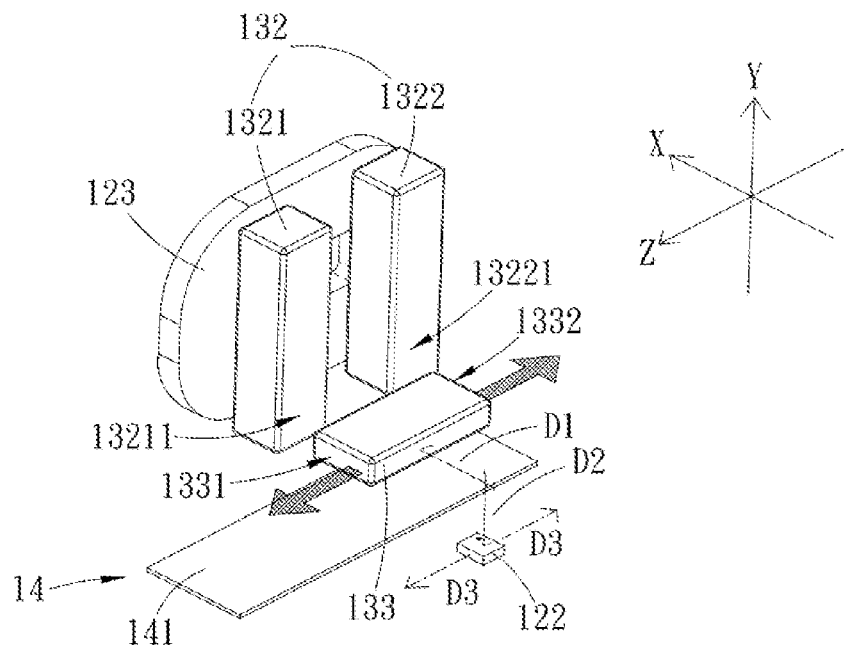
FIG. 8 is an exploded schematic view of the first embodiment of a magnetic structural combination in area C of FIG. 7.

Referring to FIG. 8, the driving magnet 132 comprises a first driving magnet 1321 and a second driving magnet 1322. A surface of the first driving magnet 1321 comprising a first driving magnetic pole 13211 corresponds to one end of the sensing magnet 133 comprising a first sensing magnetic pole 1331. A surface of the second driving magnet 1322 comprising a second driving magnetic pole 13221 corresponds to another end of the sensing magnet 133 comprising a second sensing magnetic pole 1332. Wherein the first driving magnetic pole 13211 and the first sensing magnetic pole 1331 could have the same or different polarities. The second driving magnetic pole 13221 and the second sensing magnetic pole 1332 could have the same or different polarities. Furthermore, when the first driving magnetic pole 13211 and the first sensing magnetic pole 1331 have the same polarity, the second driving magnetic pole 13221 and the second sensing magnetic pole 1332 have the same polarity, and the driving magnet 132 and the sensing magnet 133 are mutually repelling, a better magnetic fluxing effect could be provided for the magnetic sensing element 122 to sense the changes of the position or distance of the sensing magnet 133 relative to the magnetic sensing element 122.

Figure 6:
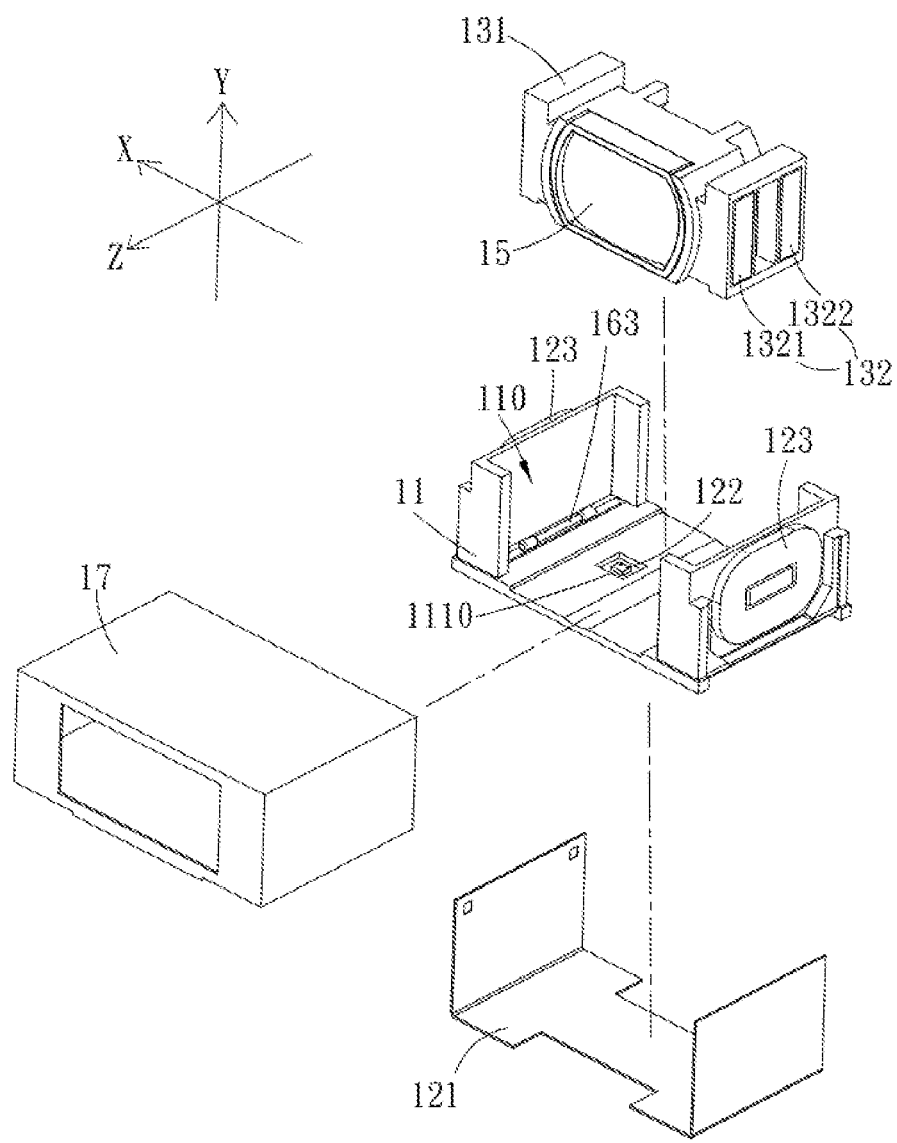
FIG. 6 is an exploded view showing the assembly for the camera device of the present disclosure.
Figure 7:
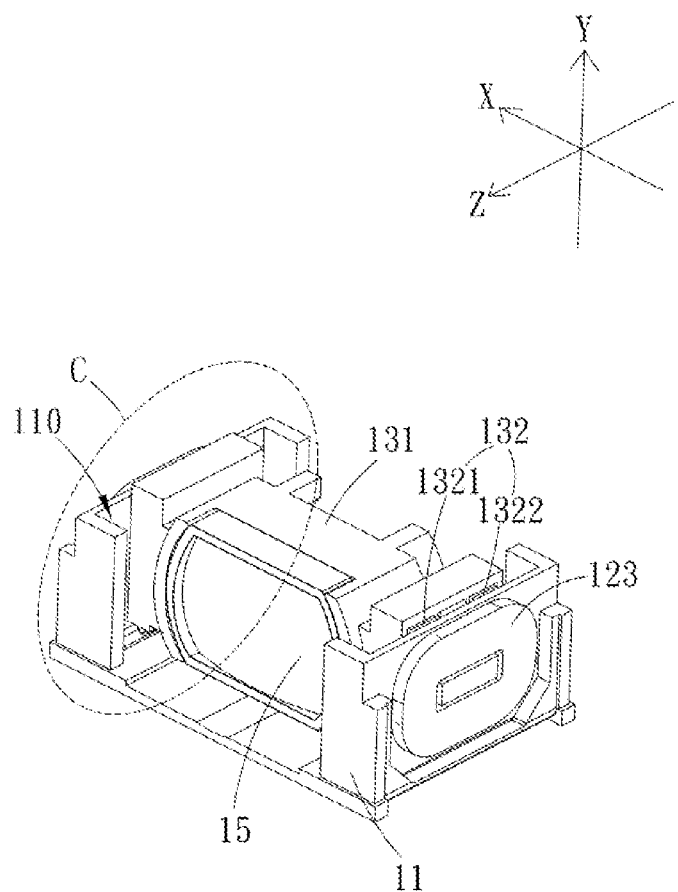
FIG. 7 shows the assembly of a part of the camera device of the present disclosure.

FIG. 6 is an exploded view showing the assembly for the camera device of the present disclosure. FIG. 7 shows the assembly of a part of the camera device of the present disclosure. As shown in the figures, the main body 131 could move back and forth in the frame body 11. The camera device 1 further comprises a guiding component 16 disposed between the frame body 11 and the main body 131. Wherein the guiding component 16 comprises a first guiding groove 161, a second guiding groove 162, and a guiding rod 163. The first guiding groove 161 is disposed at the frame body 11. The second guiding groove 162 is disposed at the main body 131 in a manner corresponding to the first guiding groove 161. The guiding rod 163 is disposed between the first guiding groove 161 and the second guiding groove 162. That is, a part of the guiding rod 163 is disposed in the first guiding groove 161, and another part of the guiding rod 163 is disposed in the second guiding groove 162. In a moving direction of the main body 131, the length of the guiding rod 163 matches the length of the second guiding groove 162, the length of the first guiding groove 161 is greater than the length of the second guiding groove 162, and two ends of the guiding rod 163 are configured to abut against a groove wall of two ends of the second guiding groove 162 and to slide in the first guiding groove 161. In this embodiment, when the main body 131 moves, the groove wall of the second guiding groove 162 of the main body 131 would push one end of the guiding rod 163 to enable the guiding rod 163 to move in the first guiding groove 161 until the other end of the guiding rod 163 abuts a groove wall of the first guiding groove 161.

Figure 9:
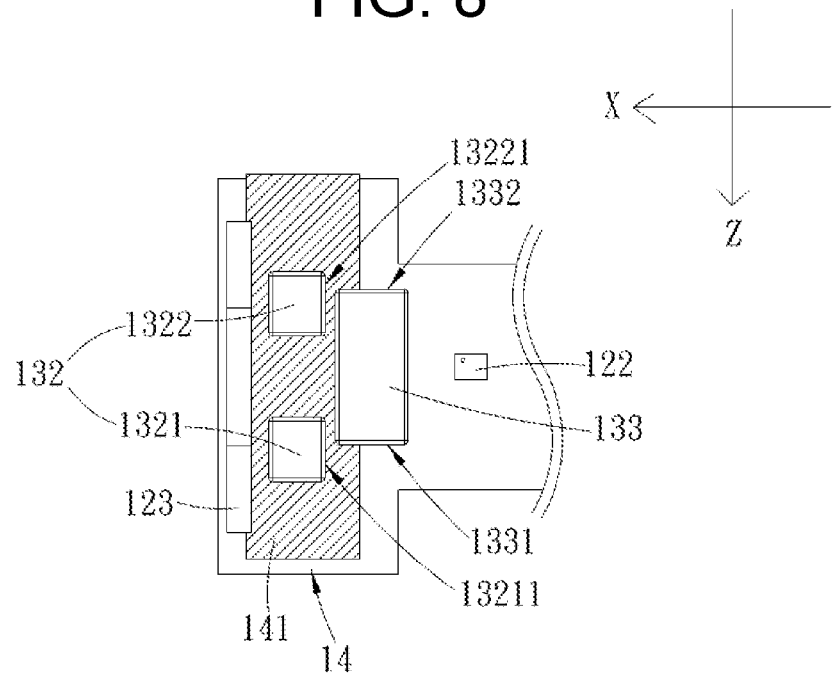
FIG. 9 is a top schematic view of the first embodiment of the magnetic structural combination in area C of FIG. 7.

In this embodiment, the circuit board 121 guides electric current through the coil 123 to change the magnetic field. The magnetic field of the coil 123 forces on the driving magnet 132 so that the driving magnet 132 would drive the main body 131 to move back and forth along the Z-axis in the accommodating space 110 of the frame body 11. The main body 131 drives the sensing magnet 133 to move back and forth along the Z-axis as well, and the magnetic sensing element 122 could sense and measure the position or distance change of the sensing magnet 133 relative to the magnetic sensing element 122. Wherein, when the magnetic sensing element 122 senses the movement of the sensing magnet 133, it could sense the angle between the sensing magnet 133 and the magnetic sensing element 122, the angle is then converted to travel distance in Z-axis by calculation (eg. trigonometry). In this case, only a single magnetic sensing element 122 (eg. Tunnel Magnetoresistance Sensor, TMR Sensor) can sense the movement of the main body 131 of a long tuning range camera assembly. In this way, the position of the main body 131 relative to the frame body 11 could be adjusted FIG. 8 and FIG. 9 are exploded and top schematic views of the first embodiment of a magnetic structural combination in area C of FIG. 7. As shown in the figures, in this embodiment, the magnetic conductive sheet 14 comprises a body 141 having an elongated rectangular sheet-structural configuration. The magnetic conductive sheet 14 is disposed at one side of the driving magnet 132 and the sensing magnet 133. Wherein the sensing magnet 133 is relatively disposed at one side of the magnetic sensing element 122. Users could partially overlap the body 141 of the magnetic conductive sheet 14, which is in the direction perpendicular to the bottom plate 111, with the driving magnet 132 according to requirements. In this way, the magnetic conductive sheet 14 could concentrate the magnetic flux of the driving magnet 132.

Moreover, as shown in the figures, in the direction perpendicular to the bottom plate 111, the body 141 of the magnetic conductive sheet 14 extends in a direction toward the sensing magnet 133. The body 141 of the magnetic conductive sheet 14 completely overlaps with the driving magnet 132, and the body 141 of the magnetic conductive sheet 14 partially overlaps with the sensing magnet 133. The magnetic sensing element 122 is distant from the sensing magnet 133 by a distance D1 along the X-axis, and the magnetic sensing element 122 is distant from the sensing magnet 133 by a distance D2 along the Y-axis. The sensing magnet 133 is displaced along the Z-axis along with the main body 131. The magnetic sensing element 122 could sense and measure the position of the sensing magnet 133, that is, the magnetic sensing element 122 is distant from the sensing magnet 133 by a distance D3 along the Z-axis. In this embodiment, the magnetic conductive sheet 14 could enhance the concentrating of the magnetic flux of the driving magnet 132 and the sensing magnet 133, which increases the accuracy of the position or distance change of the sensing magnet 133 relative to the magnetic sensing element 122 sensed and measured by the magnetic sensing element 122.

Figure 10:
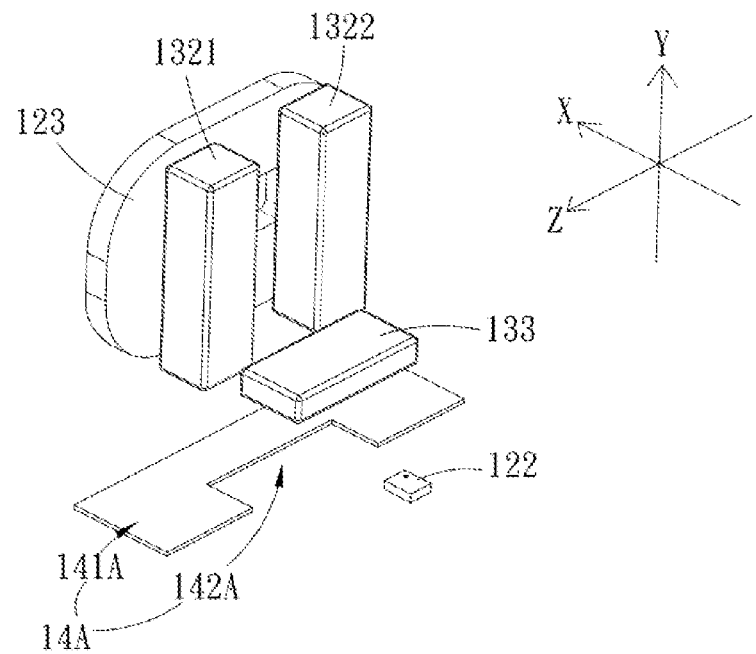
FIG. 10 is an exploded schematic view of the second embodiment of the magnetic structural combination in area C of FIG. 7.
Figure 11:
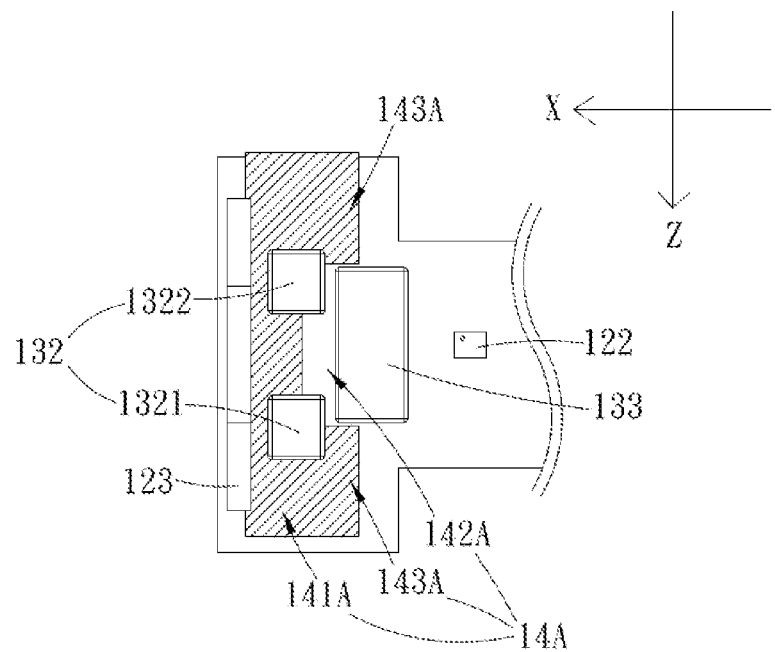
FIG. 11 is a top schematic view of the second embodiment of the magnetic structural combination in area C of FIG. 7.

FIG. 10 and FIG. 11 are exploded and top schematic views of the second embodiment of the magnetic structural combination in area C of FIG. 7. As shown in the figures, the difference between this embodiment and the first embodiment lies in the shape of the magnetic conductive sheet. In this embodiment, the magnetic conductive sheet 14A comprises a body 141A and two tabs 143A disposed at one side of the body 141A close to the sensing magnet 133, and a notch 142A exists between the two tabs 143A. In the direction perpendicular to the bottom plate 111, the body 141A completely overlaps with the driving magnet 132, the two tabs 143A do not overlap with the sensing magnet 133, and the sensing magnet 133 is partially disposed in notch 142A. In this embodiment, through the structural change of the notch 142A, the magnetic flux concentrating of the magnetic conductive sheet 14A would also be changed accordingly to enhance the magnetic flux concentrating of the driving magnet 132 and the sensing magnet 133. In this embodiment, users could select the shape and structural design of the magnetic conductive sheet 14A according to requirements, so as to adjust the magnetic sensing element 122 for sensing and measuring the sensing magnet 133.

Figure 12:
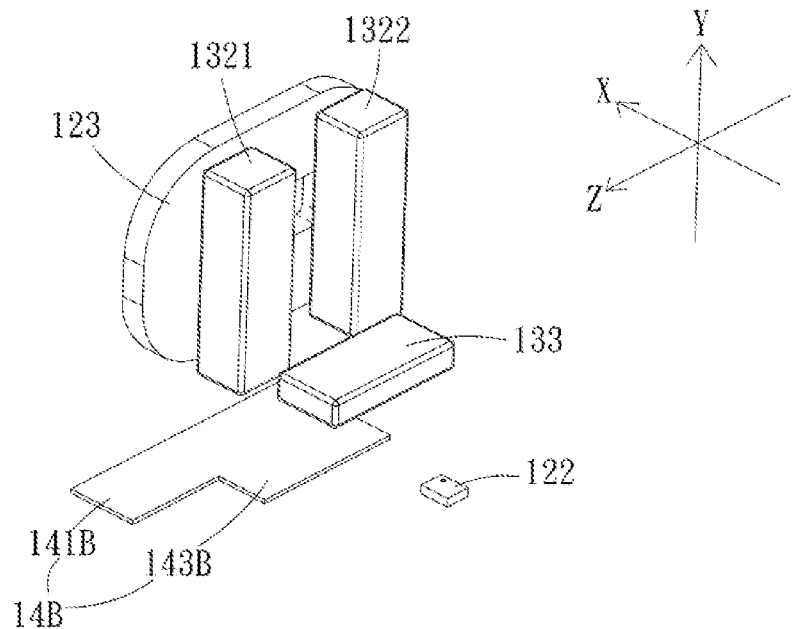
FIG. 12 is an exploded schematic view of the third embodiment of the magnetic structural combination in area C of FIG. 7.
Figure 13:
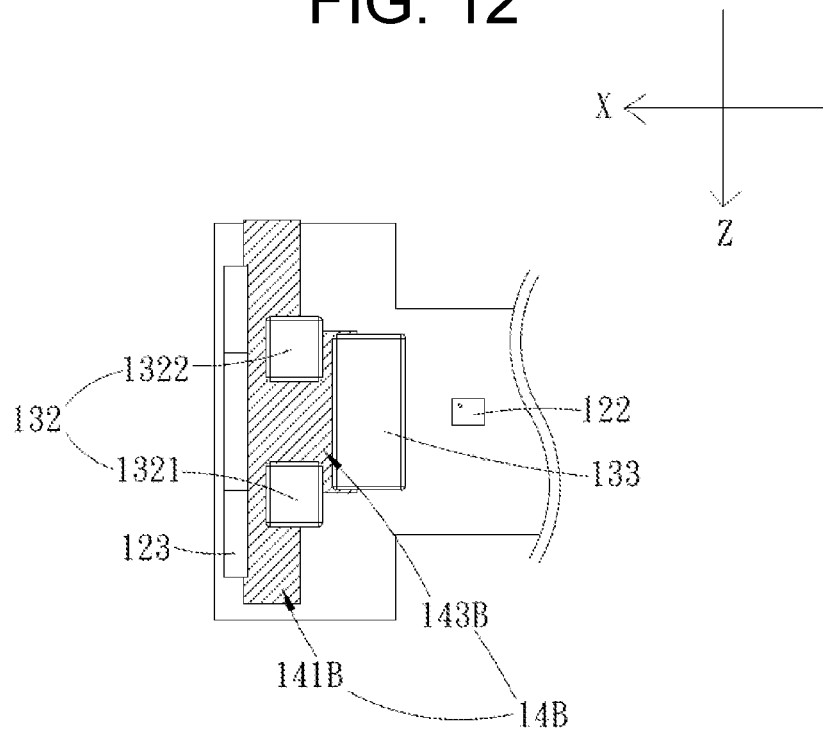
FIG. 13 is a top schematic view of the third embodiment of the magnetic structural combination in area C of FIG. 7.

FIG. 12 and FIG. 13 are exploded and top schematic views of the third embodiment of the magnetic structural combination in area C of FIG. 7. As shown in the figures, the difference between this embodiment and the first embodiment lies in the shape of the magnetic conductive sheet. In this embodiment, the magnetic conductive sheet 14B comprises a body 141B and a tab 143B. In the direction perpendicular to the bottom plate 111, the body 141B completely overlaps with the driving magnet 132. The tab 143B is disposed in the middle of the body 141B and is disposed at one side of the body 141B close to the sensing magnet 133. The tab 143B extends in the direction toward the sensing magnet 133 to partially overlap with the sensing magnet 133. The moving path of the sensing magnet 133 pasts the tab 143B of the magnetic conductive sheet 14B. In this embodiment, through the structural change of the tab 143B, the magnetic conductive sheet 14B would correspondingly change corresponding to the enhancement of the magnetic flux concentrating of the driving magnet 132 and the sensing magnet 133. In this embodiment, users could select the shape and structural design of the magnetic conductive sheet 14B according to requirements, so as to adjust the magnetic sensing element 122 for sensing the sensing magnet 133.

In this embodiment, the magnetic conductive sheet 14 comprises a body 141, and one side of the body is provided with a notch or/and a tab. Wherein the notch is disposed at one side of the body 141 close to the sensing magnet 133 or/and the tab is disposed at one side of the body 141 close to the sensing magnet 133. The magnetic conductive sheet 14 of the above-mentioned embodiment could change the structural configuration of the body 141 through the notch or the tab, which can correspondingly change the magnetic flux of the driving magnet 132 and the sensing magnet 133.

Figure 14:
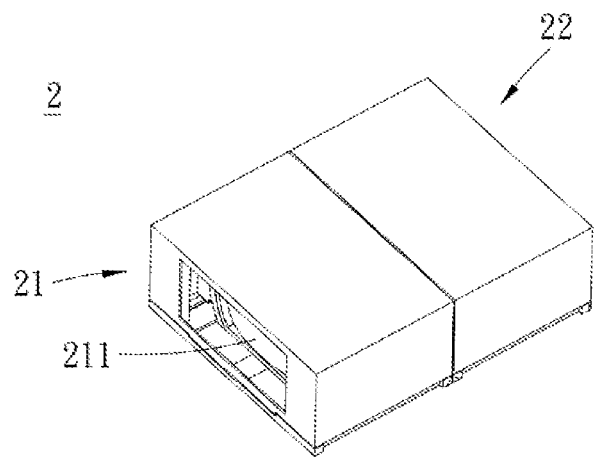
FIG. 14 is a perspective view of a long tuning range camera assembly of the present disclosure.
Figure 15:
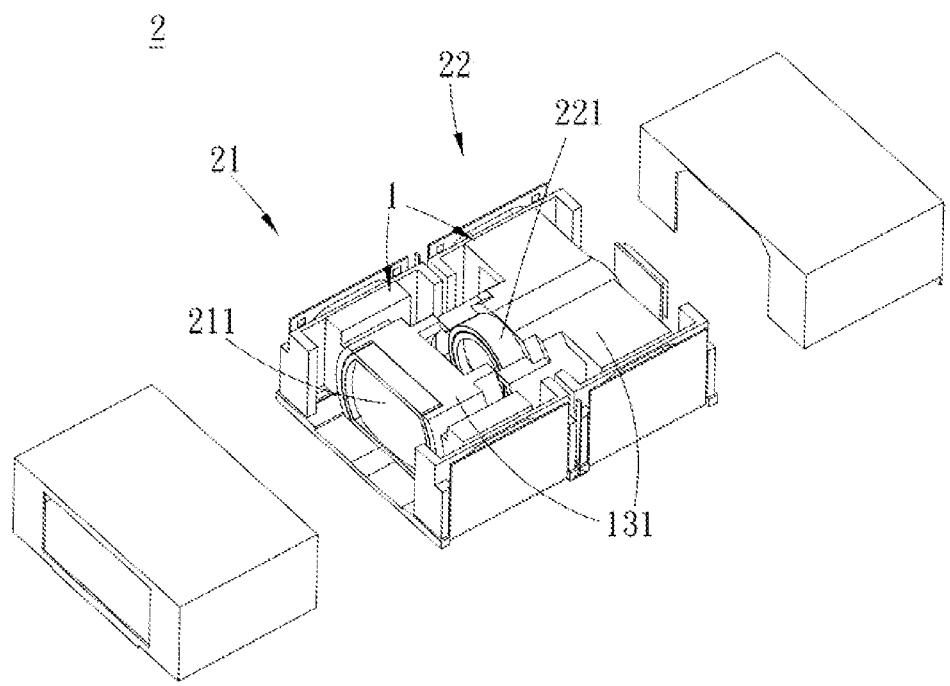
FIG. 15 is an exploded view of the long tuning range camera assembly of the present disclosure.

FIG. 14 and FIG. 15 are perspective view and exploded view of a long tuning range camera assembly of the present disclosure. As shown in the figures, this embodiment provides a long tuning range camera assembly 2, in which the lens inside has a relatively long traveling path, about 4 mm, which is for example a zoom lens. The long tuning range camera assembly 2 comprises a first camera device 21 and a second camera device 22. The first camera device 21 comprises the aforementioned camera device 1, and the first camera device 21 comprises a first lens component 211 disposed at the main body 131 of the first camera device 21. The second camera device 22 comprises the aforementioned camera device 1, and the second camera device 22 comprises a second lens component 221 disposed at the main body 131 of the second camera device 22. The first lens component 211 corresponds to the second lens component 221, and the first lens component 211 is aligned with the second lens component 221. In this embodiment, in the long tuning range camera assembly 2, by adjusting the position of the first lens component 211 of the first camera device 21 and the position of the second lens component 221 of the second camera device 22, the focusing or zooming could be realized.

In summary, embodiments of the present disclosure provide a camera device and a long tuning range camera assembly, by disposing the driving magnet and the sensing magnet on the main body carrying the lens component, the main body can be movably disposed on the frame body, and the frame body comprises a magnetic sensing element and a magnetic conductive sheet. The magnetic sensing element corresponds to the sensing magnet, and the magnetic conductive sheet corresponds to one side of the driving magnet or/and the sensing magnet. The long tuning range camera assembly is formed by the combination of a plurality of camera devices. The magnetic flux concentrating of the sensing magnet is enhanced by the magnetic conductive sheet so that the magnetic sensing element could sense the movement of the sensing magnet with higher accuracy, and the space occupied in the housing could be reduced with the total cost lowered.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera device, comprising:
   a frame body comprising an accommodating space, a bottom plate and a side plate perpendicular to the bottom plate, wherein the accommodating space is formed between the bottom plate and the side plate;
   a circuit component comprising a circuit board, a magnetic sensing element, and a coil, wherein the magnetic sensing element and the coil are disposed on the circuit board and at one side of the frame body, the circuit board is disposed at the frame body;
   a carrying component comprising a main body, a driving magnet, and a sensing magnet, wherein the main body is movably disposed in the accommodating space, the sensing magnet and the driving magnet are disposed at one side of the main body, the sensing magnet corresponds to the magnetic sensing element, the driving magnet corresponds to the coil, wherein the driving magnet is disposed on a side surface of the main body close to the side plate: the sensing magnet is disposed on a side surface of the main body close to the bottom plate; and
   a magnetic conductive sheet disposed at the frame body, wherein the magnetic conductive sheet is disposed at one side of the driving magnet or/and the sensing magnet, the magnetic sensing element is configured to magnetically sense the sensing magnet to generate a specific signal, the specific signal comprises an angle between the sensing magnet and the magnetic sensing element or/and a position of the main body relative to the frame body, wherein the magnetic conductive sheet is disposed on the bottom plate.

2. The camera device according to claim 1, wherein the magnetic conductive sheet comprises a body having an elongated rectangular sheet-structural configuration.

3. The camera device according to claim 1, wherein the magnetic conductive sheet comprises a body and a notch which is disposed at one side of the body close to the sensing magnet.

4. The camera device according to claim 1, wherein the magnetic conductive sheet comprises a body and a tab which is disposed at one side of the body close to the sensing magnet.

5. The camera device according to claim 1, wherein the magnetic conductive sheet overlaps with the driving magnet in a direction perpendicular to the bottom plate.

6. The camera device according to claim 5, wherein the magnetic conductive sheet completely overlaps with the driving magnet and partially overlaps with the sensing magnet in the direction perpendicular to the bottom plate.

7. The camera device according to claim 5, wherein the magnetic conductive sheet comprises a body and two tabs which are disposed at one side of the body close to the sensing magnet; a notch exists between the two tabs; in the direction perpendicular to the bottom plate, the body completely overlaps with the driving magnet, the two tabs do not overlap with the sensing magnet, and the sensing magnet is partially disposed in the notch.

8. The camera device according to claim 5, wherein the magnetic conductive sheet comprises a body and a tab; in the direction perpendicular to the bottom plate, the body completely overlaps with the driving magnet, the tab is disposed in the middle of the body and at one side of the body close to the sensing magnet, and the tab partially overlaps with the sensing magnet.

9. Along tuning range camera assembly, comprising:
   a first camera device comprising a camera device according to claim 1 and a first lens component disposed at the main body of the first camera device; and
   a second camera device comprising an another camera device according to claim 1 and a second lens component disposed at the main body of the second camera device, the first lens component corresponding to the second lens component, the first lens component being aligned with the second lens component.

10. The long tuning range camera assembly according to claim 9, wherein the frame body of the first camera device and/or the second camera device comprises a bottom plate and a side plate perpendicular to the bottom plate; the accommodating space is formed between the bottom plate and the side plate; the sensing magnet is disposed on a side surface of the main body close to the bottom plate; the driving magnet is disposed on a side surface of the main body close to the side plate; the magnetic conductive sheet is disposed on the bottom plate.

11. The long tuning range camera assembly according to claim 9, wherein the driving magnet of the first camera device and/or the second camera device comprises a first driving magnet and a second driving magnet; a surface of the first driving magnet comprising a first driving magnetic pole corresponds to one end of the sensing magnet comprising a first sensing magnetic pole; a surface of the second driving magnet comprising a second driving magnetic pole corresponds to one end of the sensing magnet comprising a second sensing magnetic pole.

12. A camera device, comprising:
a frame body comprising an accommodating space;
a circuit component comprising a circuit board, a magnetic sensing element, and a coil, wherein the magnetic sensing element and the coil are disposed on the circuit board and at one side of the frame body, the circuit board is disposed at the frame body;
a carrying component comprising a main body, a driving magnet, and a sensing magnet, wherein the main body is movably disposed in the accommodating space, the sensing magnet and the driving magnet are disposed at one side of the main body, the sensing magnet corresponds to the magnetic sensing element, the driving magnet corresponds to the coil; and
a magnetic conductive sheet disposed at the frame body, wherein the magnetic conductive sheet is disposed at one side of the driving magnet or/and the sensing magnet, the magnetic sensing element is configured to magnetically sense the sensing magnet to generate a specific signal, the specific signal comprises an angle between the sensing magnet and the magnetic sensing element or/and a position of the main body relative to the frame body;
wherein the driving magnet comprises a first driving magnet and a second driving magnet; a surface of the first driving magnet comprising a first driving magnetic pole corresponds to one end of the sensing magnet comprising a first sensing magnetic pole; a surface of the second driving magnet comprising a second driving magnetic pole corresponds to one end of the sensing magnet comprising a second sensing magnetic pole.

13. The camera device according to claim 12, wherein the first driving magnetic pole and the first sensing magnetic pole have the same polarity; the second driving magnetic pole and the second sensing magnetic pole have the same polarity.

14. A camera device, comprising:
a frame body comprising an accommodating space;
a circuit component comprising a circuit board, a magnetic sensing element, and a coil, wherein the magnetic sensing element and the coil are disposed on the circuit board and at one side of the frame body, the circuit board is disposed at the frame body;
a carrying component comprising a main body, a driving magnet, and a sensing magnet, wherein the main body is movably disposed in the accommodating space, the sensing magnet and the driving magnet are disposed at one side of the main body, the sensing magnet corresponds to the magnetic sensing element, the driving magnet corresponds to the coil;
a magnetic conductive sheet disposed at the frame body, wherein the magnetic conductive sheet is disposed at one side of the driving magnet or/and the sensing magnet, the magnetic sensing element is configured to magnetically sense the sensing magnet to generate a specific signal, the specific signal comprises an angle between the sensing magnet and the magnetic sensing element or/and a position of the main body relative to the frame body; and
a guiding component disposed between the frame body and the main body.

15. The camera device according to claim 14, wherein the guiding component comprises a first guiding groove, a second guiding groove, and a guiding rod; the first guiding groove is disposed at the frame body; the second guiding groove is disposed at the main body in a manner corresponding to the first guiding groove; the guiding rod is disposed between the first guiding groove and the second guiding groove.

16. The camera device according to claim 15, wherein in a moving direction of the main body, a length of the guiding rod matches a length of the second guiding groove, a length of the first guiding groove is greater than the length of the second guiding groove, and two ends of the guiding rod are configured to abut against a groove wall of two ends of the second guiding groove and to slide in the first guiding groove.

\* \* \* \* \*